United States Patent [19]

Nakano et al.

[11] 3,890,574

[45] June 17, 1975

[54] TIME-SHARING SCANNING RECEIVER

[75] Inventors: Masao Nakano; Kazuyoshi Imazeki, both of Tokyo, Japan

[73] Assignee: General Research of Electronics, Inc., Chicago, Ill.

[22] Filed: Sept. 4, 1973

[21] Appl. No.: 394,120

[52] U.S. Cl. .................................. 325/470; 343/205

[51] Int. Cl. .............................................. H04b 1/32

[58] Field of Search ............. 325/31, 332, 334, 335, 325/468, 469, 470; 343/205, 206; 334/15

[56] References Cited

UNITED STATES PATENTS

| | | | |
|---|---|---|---|
| 3,482,166 | 12/1969 | Gleason | 343/206 |
| 3,614,621 | 10/1971 | Chapman et al. | 325/469 |
| 3,617,895 | 11/1971 | Tomsa et al. | 325/334 |
| 3,750,032 | 7/1973 | Andrews | 325/334 |
| 3,803,495 | 4/1974 | Reynolds | 325/470 |

*Primary Examiner*—Benedict V. Safourek
*Attorney, Agent, or Firm*—Fitch, Even, Tabin & Luedeka

[57] ABSTRACT

A scanning radio receiver automatically scans a plurality of channels of respective predetermined frequencies on a time sharing basis. Periodic gating signals gate on a respective plurality of gated oscillators sequentially and periodically to tune in the respective channels successively for mutually exclusive portions of the time-sharing cycle. A channel selector responsive to gating pulses produces enabling pulses which are utilized to couple the RF section of the receiver to the audio amplifier and subsequent transducer only during the portion of each scanning cycle when the receiver is tuned to a selected frequency. A signal level sensor produces control signals whenever the received signals exceed a predetermined level. The control signals are applied to respective visual indicators along with respective gating signals to indicate when signals are being received on the respective channels, irrespective of which is the selected channel. A priority channel selector responsive to the control signal overrides the channel selector when a selected priority channel is being received.

13 Claims, 2 Drawing Figures

PATENTED JUN 17 1975

3,890,574

TIME-SHARING SCANNING RECEIVER

Figures 1, 2:
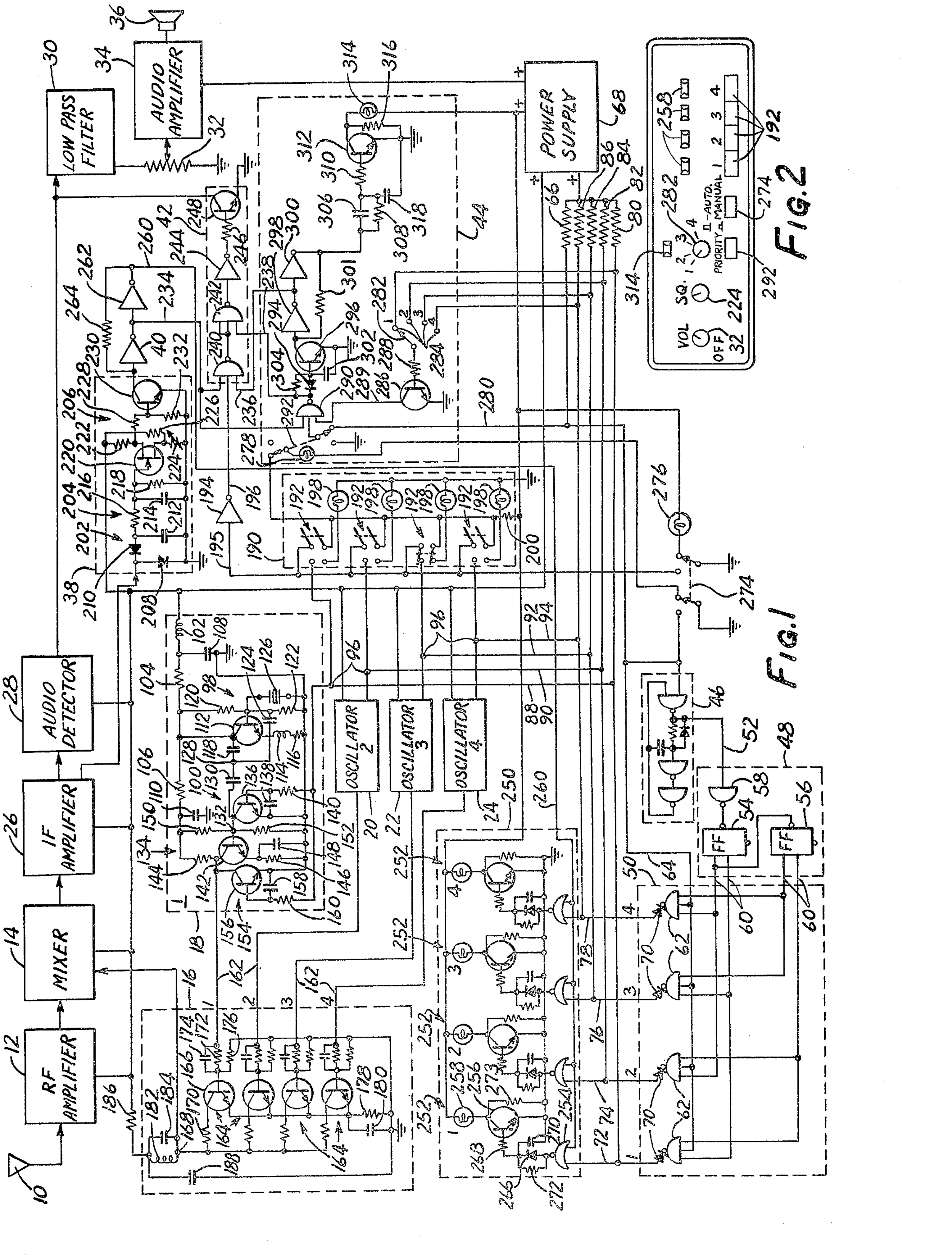

The present invention relates generally to scanning radio receivers and particularly to such receivers which scan a predetermined plurality of frequencies and more particularly to such receivers wherein the plurality of frequencies are continuously scanned on a time sharing basis. The invention further relates to such receivers which automatically tune to a priority frequency when a signal of that frequency is received.

Signal-seeking receivers are well known for their convenience in automatically tuning to any one of a plurality of frequencies such as those corresponding to television channels, broadcast radio stations or two-way communications channels. With the advent of solid state circuitry, conventional signal-seeking receivers have been developed which generally operate more efficiently and accurately than predecessor systems employing electric motors or series of relays for varying the tuning portions of the receivers. One particularly attractive application for a signal-seeking receiver is a two-way communications system having a plurality of frequencies or channels. In such system, a signal-seeking receiver enables the listener to monitor all of the stations without having to tune the receiver manually to each of the stations continuously. Moreover, the signal-seeking receiver is especially convenient for a two-way receiver because the listener often has his hands occupied.

One difficulty with many such systems has been that when the receiver was tuned to and receiving a signal on one of the frequencies, other channels might come on the air unbeknownst to the listener. In some instances, the communications carried on the other channels might be more important to the listener than those on the channel to which the receiver is tuned. This problem has been partially overcome in some instances by use of a priority channel system wherein the receiver is automatically tuned to a priority channel whenever it comes on the air while the receiver is tuned to some other channel. Such priority channel systems have admitted of only one channel having priority and have left the listener with no way of knowing when other channels were on the air without advancing the receiver through its cycle of channels.

In accordance with the present invention, all of the channels are sampled periodically on a time sharing basis. Only the signal received on a selected channel is applied to the audio amplifier for communication to the listener. At the same time the signals received on any other channels are utilized to indicate which of the other channels are on the air. Further, a priority channel system may be included so that when a particular channel comes on the air, the receiver is automatically turned to that channel.

It is therefore an object of the invention to provide an improved receiver wherein a plurality of channels are sampled periodically on a time sharing basis with a selected one of the channels being utilized for audio reception. It is another object of the invention to provide such system with a priority channel system.

Other objects and advantages of the invention will be evident from the following detailed description particularly when taken in conjunction with the accompanying drawings wherein:

FIG. 1 is an electrical schematic diagram of a preferred embodiment of the time-sharing receiver of the present invention, and FIG. 2 is a front elevation of an instrument panel for the receiver shown in FIG. 1.

Referring to FIG. 1, the illustrated embodiment of the receiver comprises an antenna 10 for receiving a plurality of radio signals and for applying the signals to an RF section comprising an RF amplifier 12 and a mixer 14 of a superheterodyne receiver circuit. The received RF signals are amplified by the amplifier 12 and applied to the mixer 14. At the same time, a beating signal is applied to the input of the mixer 14 from an amplifier circuit 16. The RF section is thereby tuned to a frequency determined by the frequency of the beating signal. The frequency of the beating signal is determined by variable tuning means comprising a plurality of gated local oscillators 18, 20, 22, 24, each of which is tuned to a different predetermined frequency and gated so that only one oscillator is on at a time. The illustrated circuit shows four such oscillators and provides a four-channel system. Many more channels may be provided, as desired, with a separate oscillator for each channel. The particular oscillator which is gated to be on at any one time determines the frequency of the beating signal and hence determines the channel to which the receiver is tuned. As will be described in greater detail below, the respective oscillators are gated on sequentially and periodically to tune the RF section to the frequencies of respective channels on a time sharing basis.

The output of the mixer 14 is an IF signal which is applied to and amplified by an IF amplifier 26 in a conventional manner. The amplified output of the IF amplifier 26 is applied to an audio detector 28 which operates in a conventional fashion to produce an audio signal. The audio signal is applied through a low-pass filter 30 to a potentiometer volume control 32, whence it is applied to an audio amplifier 34. The low-pass filter may be a conventional filter. It functions to filter out the high-frequency aberrations occasioned by the time-sharing switching. The audio amplifier 34 amplifies the audio signal and applies the amplified audio signal to a loud-speaker 36 or other signal utilization means such as earphones.

At the same time, an output from the IF amplifier 26 is applied to a signal level sensing or squelch circuit 38 which operates in a conventional fashion to produce an output control signal indicative of input signal level and hence whether or not a signal is being received on the channel to which the receiver is tuned at the time. The control signal is inverted by a first squelch signal inverter 40, and the inverted control signal is applied to a muting logic circuit 42. (Either signal may be considered a control signal, as it is merely a matter of circuit convenience which is used in a particular logic application.) The muting logic circuit 42 serves in response to the control signal to clamp the output of the audio detector 28 to ground when the receiver is not receiving a sufficiently strong signal on the channel to which it is tuned at the time so that annoying non-intelligence signals are not produced at the speaker 36.

A priority channel circuit 44 provides means for tuning in a priority channel when that channel is being received and applying the related audio signal to the audio amplifier 34, irrespective of whether or not the channel regularly selected is being received. To this end, the priority channel circuit 44 provides priority signals to the muting logic circuit 42.

In accordance with the illustrated embodiment of the invention, the connecting of the respective oscillators 18, 20, 22, and 24 to the amplifier 16 on a time sharing basis for channel scanning is achieved by a sequential switching system comprising a clock 46, a counter 48 and a decoder 50. The clock 42 may comprise any of a number of common oscillator circuits which produce clock pulses periodically on a conductor 52 over which the clock pulses are applied to the counter 48. The counter 48 may comprise an arrangement of flip-flop circuits 54, 56 which count the clock pulses applied over the conductor 52 through an inverter 58 and produce signals in parallel binary form on conductors 60 over which the binary signals are applied to the decoder 50. The decoder 50 is basically a two-line to four-line decoder. As illustrated, it comprises a NAND gate 62 for each channel. Each of the NAND gates has three input terminals. Two of these terminals are connected to respective outputs of respective flip-flop circuits 54 and 56. The third input terminal is coupled by a conductor 64 through a resistor 66 to a positive potential provided by a power supply 68.

The output of each of the NAND gates 62 is coupled through a diode 70 to a respective conductor 72, 74, 76, 78 for each channel 1, 2, 3 and 4. These conductors are coupled to positive potential supplied by the power supply 68 through respective resistors 80, 82, 84 and 86. The diodes 70 are poled with their cathodes connected to the NAND gates 62. Thus, as the counter 48 counts the clock pulses supplied by the clock 46, conductors 72, 74, 76 and 78 are successively driven low for mutually exclusive periods. More particularly, they are driven to ground or 0 logic for successive mutually exclusive periods. These low or ground pulses are gating signals applied over respective conductors 88, 90, 92 and 94 to a gating signal input terminal 96 of each respective oscillator 18, 20, 22 or 24 for each of the respective channels 1, 2, 3 and 4.

Except for their frequency-determining elements, the oscillators 18, 20, 22, and 24 may be the same. It will therefore suffice to describe but one of them in detail. As illustrated, the gated oscillator 18 includes an oscillator circuit 98 and a gating circuit 100. Power is supplied to the gated oscillator 18 from the power supply 68 through a filter which may comprise a series inductor 102, series resistors 104 and 106 and shunting capacitors 108 and 110. The illustrated oscillator circuit 98 comprises a transistor 112 with its collector coupled to the power supply 68 and its emitter coupled through an inductor 114 in series with a resistor 116 to ground. The collector is connected to the emitter through a capacitor 118 to provide feedback. A resistor 120 is connected between the power supply and the base of the transistor 112. The base is coupled to ground through a resistor 122 to provide appropriate bias to the base. The base is coupled to the emitter by a capacitor 124. A crystal 126 is connected between the base and ground. With this arrangement, a beating signal is developed at a terminal 128 connected to the emitter at a beating frequency determined by the crystal 126.

To assure stable oscillation without starting transients, all of the oscillators are on at all times. It is their outputs that are gated to provide scanning of the frequencies. To this end, each beating signal is supplied through a capacitor 130 to a terminal 132 as the input of a buffer amplifier 134. The gating circuit 100 is connected between the terminal 132 and ground. The gating circuit comprises a transistor 136 with its collector connected to the terminal 132 and its emitter connected to ground. A capacitor 138 is connected between the base and emitter. The base is coupled through a resistor 140 to the conductor 88. When the grounded gating pulse appears on the conductor 88, the transistor 138 is turned off and the beating signal is applied to the input of the buffer amplifier 134. On the other hand, whenever the potential on the conductor 88 goes positive, the transistor 136 is rendered conductive thus clamping the terminal 132 to ground and turning off the input to the buffer amplifier 134.

The buffer amplifier 134 may comprise a transistor 142 with its collector coupled to the power supply through a resistor 144 and with its emitter connected to ground through a resistor 146 in parallel with a capacitor 148. The base is connected to the terminal 132. Bias is supplied to the base by connecting it to the power supply through a resistor 150 and to ground through a resistor 152.

A further gating circuit 154 is connected between the collector of the transistor 142 and ground. This gating circuit comprises a transistor 156 with its collector connected to the collector of the transistor 142 and with its emitter connected to ground. Its emitter is coupled to its base through a capacitor 158. The base is coupled to the conductor 88 through a resistor 160 to receive gating pulses. Thus, the gating circuit 154 acts in the same fashion as the gating circuit 100 to clamp the output of the buffer amplifier 134 to ground whenever a positive signal appears on the conductor 88 and passes the amplified beating signal whenever the gating signal drives the potential of the conductor 88 to ground. The two gating circuits are used to assure sufficient attenuation of the unwanted beating signals.

The output of each oscillator 18, 20, 22, and 24 is applied from the respective collector of the respective transistor 142 over a respective conductor 162 to a respective amplifier 164 of the amplifier circuit 16. Each amplifier 164 comprises a transistor 166 having its collector connected to an output terminal 168 through a resistor 170 and its base connected to the conductor 162 through a resistor 172 in parallel with a capacitor 174. Each base is connected through a resistor 176 to ground. The emitters of all of the transistors 166 are coupled to ground through a resistor 178 in parallel with a capacitor 180. The output terminal 168 is coupled to the power supply through an isolation circuit comprising an inductor 182 and a capacitor 184 through a resistor 186. A filter capacitor 188 is connected between the resistor 186 and ground.

With the circuit as thus far described, the clock 46 produces clock pulses which are counted by the counter 48 to operate the decoder 50 to place ground or 0 gating pulses on the respective conductors 72, 74, 76, 78. These gating pulses are applied successively and mutually exclusively to the respective gated oscillators 18, 20, 22 and 24 which thereupon apply beating signals at respective beating frequencies successively and mutually exclusively to the respective amplifiers 164. This produces beating signals at the respective beating frequencies successively and mutually exclusively at the output terminal 168 whence they are applied to the mixer 14. This tunes the RF section to the respective channels successively at a frequency determined by the frequency of the clock 46. The frequency of the clock pulses is made high relative to audio frequencies and low relative to the RF and beating frequencies. 15 kilohertz has been found suitable. Thus, the output of the mixer 14 includes the signals received on each of the channels successively on a time sharing basis.

A channel selector circuit 190 provides means for selecting one of the respective channels for applying to the audio amplifier 34. The channel selector 190 comprises a double-pole, single-throw switch 192 for each channel. The switches 192 may be of the push button variety as illustrated more particularly in FIG. 2 and are preferably interconnected in a conventional manner so that only one switch 192 may be closed at one time; thus, whenever one closes the switch 192 for channel 2, it opens any other switch 192 that may be closed, such as switch 192 for channel 3. The closure of any switch 192 connects the respective conductor 88, 90, 92, or 94 to an inverter 194 through a conductor 195. In FIG. 1, the switch 192 for channel 3 is closed; therefore, it is channel 3 which is the selected channel. The gating pulse on the conductor 76 is thereby applied to the inverter 194. Thus, when the negative gating pulses appear on the conductor 76 positive or 1 enabling pulses appear on a conductor 196 at the output of the inverter 194. These enabling pulses are applied to the muting logic circuit 42 which operates as an enabling circuit to clamp the audio signal to ground except during the positive enabling pulses on the conductor 196. The audio amplifier 34 thus receives audio signals only during the portion of the scanning cycle when the selected channel is tuned in by application of the respective gating pulses to the respective gated amplifier 18, 20, 22 or 24.

The channel selector circuit 190 includes a channel selector lamp 198 for each channel. Closure of the respective switch 192 connects the respective lamp 198 between ground and the power supply 68 through a resistor 200, thus serving to indicate to the operator which channel has been selected. Conveniently, the lamps may be placed under the push buttons of the switches 192 as shown in FIG. 2, which push buttons may be translucent so that the selected channel is indicated by illumination of the respective push button.

As illustrated in FIG. 1, the signal level sensing circuit 38 may comprise a detector 202, a filter 204 and a threshold circuit 206. The filter 202 comprises diodes 208 and 210 which receive the IF signal from the IF amplifier 26 and convert it to a pulsating direct current. The filter 204 comprising capacitors 212 and 214 and resistors 216 and 218 filter out the high frequency components. However, the filter retains the changes in direct current voltage occasioned by the channel switching in the time-sharing process.

The threshold circuit 206 comprises a field effect transistor 220 with its source connected to the power supply 68 through a load resistor 222 and with its drain connected to ground through a variable resistor 224 and to the power supply 68 through a resistor 226. The detected signal passed by the filter 204 is indicative of the signal level being received on the respective channels. This signal is applied to the gate of the field effect transistor 220 which acts as an amplifier providing a related signal at its source. This signal is applied through a resistor 228 to the base of a transistor 230, the base being coupled to ground through a resistor 232. The emitter of the transistor 230 is connected to ground.

The transistor 230 acts as a gate for clamping the collector of the transistor 230 to ground whenever the threshold of the threshold circuit 206 is exceeded.

The voltage level at the collector of the transistor 230 is the control signal output of the signal level sensing circuit 38. The threshold of the threshold circuit 206 is set by the variable resistor 224 at whatever level may be reasonably considered to indicate reception of an adequate signal on a respective channel. Whenever the received signal is less than this amount, the control signal output of the signal level sensing circuit 38 remains high. The control signal output of the signal level sensing circuit 38 is inverted by the first squelch signal inverter 40 to provide an inverted control signal on a conductor 234. That is, a high potential on the conductor 234 indicates reception of a signal on the respective channel.

The muting logic circuit 42 receives control signals over the conductor 234 and enabling pulses over the conductor 196. The muting logic circuit 42 also receives logic signals from the priority channel circuit 44. The operation of the priority circuit 44 will be discussed at length below. For the moment, it will be sufficient to state that when the priority channel circuit 44 is turned off or the priority channel is not being received, a high logic signal is applied to the muting logic circuit 42 on each of conductors 236 and 238. Logic signals on conductors 234, 196 and 236 are applied to respective input terminals of a NAND gate 240. The NAND gate 240 thus produces a low logic signal when the input signals to all of its input terminals are high and a high output signal at all other times.

With the priority channel circuit off or the priority channel not being received, the input on conductor 236 is high. Whenever a signal is being received on the channel for the moment gated on by the gating pulses from the decoder 50, a high control signal is applied over the conductor 234. During that portion of the scanning cycle that the channel selected by the channel selector circuit 190 is gated on by the gating pulses, a high enabling pulse appears on the conductor 196. Thus, a low signal on the output of the NAND gate 240 is indicative of signal reception on the channel selected by the channel selector circuit 190 in the absence of contrary instructions from the priority channel circuit 44.

The output of the NAND gate 240 is applied to an input of a NAND gate 242. The conductor 238 is connected to another input of the NAND gate 242 providing a high input with the priority channel circuit off or the priority channel not receiving. Thus, the output of the NAND gate 242 is high when the output of NAND gate 240 is low unless otherwise instructed by the priority channel circuit. The output of the NAND gate 242 is inverted by an inverter 244 and applied through a resistor 246 to the base of a transistor 248, the emitter of which is connected to ground and the collector of which is connected to the input of the low-pass filter 30.

Thus, when no other instructions are received from the priority circuit 44, the transistor 248 is the its nonconducting state whenever signals are being received upon the channel selected by the channel selector 190 and at all other times the transistor 248 clamps the input of the low pass filter to ground. This effectively couples the RF section to the audio amplifier only during the portion of each scanning cycle when the RF section is tuned to the channel selected by the channel selector 190 and then only when signals are being received on that channel. The audio signals are passed by the low pass filter 30 which filters out the higher frequencies occasioned by the time-sharing channel switching and passes the audio signal to the audio amplifier 34 for amplification and application to the speaker 36.

As previously mentioned, it is important to be able to tell which of the channels are on the air other than the one selected. This is particularly true as the receiver does not automatically scan from channel to channel locking on a particular channel being received. Rather, the channel to be received is selected by the channel selector circuit 190 and only signals received on that channel are passed to the audio amplifier. A channel-receiving indicator circuit 250 indicates when any channel is being received, irrespective of whether or not it is the selected channel. For each channel there is an indicator circuit 252 each comprising a NOR gate 254, a gating transistor 256 and an indicator lamp 258. Each NOR gate has two input circuits, one connected to a respective conductor 72, 74, 76 or 78 and the other connected by a conductor 260 to a second squelch signal inverter 262 which again inverts the control signal on the conductor 234 to produce a low logic signal when the channel to which the receiver is turned at the time is receiving. (This, too, may be considered a control signal.) For increased stability, a resistor 264 is connected from the conductor 260 to the input of the first inverter 40.

With the NOR gates thus connected, the respective NOR gates produce high output signals whenever both inputs are low and a low output signal at other times. Taking, for example, the indicator circuit for channel 1, the NOR gate 254 produces a high output signal when the signals on conductors 72 and 260 are both low. The signal on the conductor 72 is low when the gating pulses from the decoder 50 selects the first channel to be turned on. The signal on the conductor 260 is low whenever the channel to which the receiver is tuned is on the air. Thus, the NOR gate 254 for channel 1 provides a high signal whenever channel 1 is being received. On the other hand, if the decoder 50 turns on channel 1 producing a low signal on the conductor 72 but channel 1 is not on the air, a high signal appears on the conductor 260 and the output of the NOR gate 254 remains low. If other channels 2, 3 or 4 are on the air, the conductor 260 will go high for the respective parts of the time-sharing cycle, but this will leave the output of the NOR gate 254 low if channel 1 is not being received, for the gating signal on the conductor 72 will remain high during those other portions of the time-sharing cycle.

A high signal at the output of a NOR gate 254, which indicates the respective channel is on the air, is applied through a diode 266 and a resistor 268 to the base of the transistor 256 turning the transistor 256 on and thereby completing the circuit through the respective lamp 258 from the power supply 68 to ground. This turns on that respective indicator lamp which is visible on the instrument panel above the respective switch 192. Thus, any lamp 258 that is turned on indicates that that respective channel is being received irrespective of whether or not that channel is the one selected by the channel selector circuit 190. To keep the lamp fully on over the entire time-sharing cycle, the signal applied through the diode 266 also charges a capacitor 270. This keeps the diode 266 turned on during the other portions of the cycle when no high signal is produced by the respective NOR gate 254. A resistor 272 is connected across each diode 266 to discharge the respective capacitor 270 within a reasonable time so that the respective lamp 258 will go off shortly after the respective channel goes off the air. A resistor 273 is connected between the lamp 258 and ground to conduct a small current keeping the filament of the lamp preheated when the transistor 256 is non-conductive.

The receiver, as thus far described, provides for automatic scanning of the respective channels on a time-sharing basis. Means is also provided for manual operation. The receiver is changed from one mode to another by a double-pole, double-throw mode switch 274.

The position of the switch 274 indicated in FIG. 1 is for the automatic mode. In this position, the switch 274 connects an indicator lamp 276 between ground and the power supply 68. Coveniently, the lamp may be placed under the push button operating the mode switch 274, which push button may be translucent so that illumination of the switch 274 indicates that the receiver is in the automatic mode. At the same time, in the automatic mode the switch 274 connects an indicator lamp 278 in the priority circuit 44 to ground as will be discussed further below.

When the mode switch 274 is placed in the manual position, the input to the clock 46 is grounded, turning off the clock and stopping the time sharing. This also grounds the conductor 64, assuring that the outputs of all NAND gates 62 are positive. This also grounds a conductor 280 to turn off the priority circuit, as will be described further below. At the same time, the mode switch 274 grounds the conductor 195, whereupon the closure of any switch 192 connects the respective conductor 88, 90, 92 or 94 to the grounded conductor 195. This provides a gating signal to the respective oscillator 18, 20, 22 or 24, turning that oscillator on. With the switches 192 disposed as shown in FIG. 1, it is channel 3 that is selected by closure of the respective switch 192. Channel 3 thus is on at all times, as there is no time sharing in this mode. Grounding of the conductor 195 also provides an enabling pulse for the muting logic circuit 42 at all times. The muting logic circuit 42 then allows the audio signals to pass to the low-pass filter 30 at all times that signals are being received on the selected channel as indicated by the control signal on the conductor 234.

The priority channel circuit 44 includes a priority channel selector switch 282 for selecting a particular channel for priority. The switch 282 may engage any one of four contacts 284 each connected to a respective conductor 72, 74, 76 or 78. The switch 282 thus connects a selected one of these contacts for connection to the base of a gating transistor 286 through a resistor 288. The collector of the transistor 286 is connected by a conductor 289 to one input of a NAND gate 290 and the emitter is grounded. In the position illustrated in FIG. 1, it is channel 1 which is the priority channel. Whenever the decoder 50 produces a gating pulse driving conductor 72 low in the time-sharing sequence, the transistor 286 does not conduct and conductor 289 goes high. At all other times, the conductor 289 is grounded, applying a low logic signal to the conductor 289. A second input to the NAND gate 290 is the inverted control signal applied over the conductor 234. A third input to the NAND gate 290 is used to turn the priority circuit on or off. This third input is controlled by a double-pole, double-throw priority channel enabling switch 292. The enabling switch 292 connects the third input of the NAND gate 290 either to the conductor 280 or to ground. When connected to ground, the priorty circuit is turned off and the output and the NAND gate 290 is high irrespective of the inputs on the conductors 234 and 289. On the other hand, when the switch 292 is in the position shown in FIG. 1, the third input to the NAND gate 290 is developed upon the conductor 280 and is a high signal derived on the conductor 64 through the resistor 66 and the priority except when the switch 274 is placed in the manual position. When the switch 274 is in the manual position, conductor 280 is grounded, thus turning off the priority circuit 44 by driving the third input to the NAND gate 290 low.

With the switch 274 on automatic and the priority channel enabling switch 292 connecting the third input of the NAND gate 290 to the conductor 280, the NAND gate 290 will produce a low output whenever the signal level on the priority channel is above the predetermined threshold level and, a high output at all other times, for only when there is coincidence of a priority channel enabling signal from the switch 292, gating signals on the conductor 289 and a control signal on the conductor 234, will all inputs be driven high coincidentally. When the output of the NAND gate 290 goes low, the low signal is supplied as a priority signal through the conductor 238 to the NAND gate 242 driving the output of the NAND gate 244 high irrespective of any other inputs of the muting logic 42. This renders the transistor 248 non-conductive and passes the signal from the audio detector 28 to the low-pass filter 30 irrespective of the selection of some other channel by the channel selector circuit 190.

At the same time, the low signal on the low conductor 238 is applied through a diode 294 to the base of a transistor 296 rendering the transistor 266 non-conductive. The emitter of the transistor 296 is grounded and the collector is connected to the input of an inverter 298. The output of the inverter 298 is connected to the conductor 236 and also to the input of an inverter 300. A resistor 301 is connected between the output of the inverter 300 and the input of the inverter 298 to stabilize the circuit. Thus, when the priority signal on the conductor 238 goes low, the input to the input inverter 298 goes high and the priority signal on the conductor 236 goes low.

It is important that the muting logic circuit 42 not pass signals of any channel except the priority channel when the priority channel is being received. Even though closure of a switch 192 of the channel selector circuit 190 would produce a high signal on the conductor 196 coincident with a high signal on the conductor 234 indicating that the selected channel is being received, the priority signal on the conductor 236 drives the output of the NAND gate 240 high. This places control of the enabling action of muting logic circuit 42 on the condition of the priority signal applied to the conductor 238. In order that the NAND gate 240 produce a high output for the entire time-sharing cycle whenever the priority channel is being received during its portion of the cycle, a low signal from the NAND gate 290 is held on a capacitor 302 for at least the period of one cycle. The charge on the capacitor 302 is "leaked off" through a resistor 304 after a short period of time so that the channel selected by the channel selector circuit 190 is again enabled shortly after the priority channel goes off the air. The charge on the capacitor 302, of course, does not affect the priority signals applied over the conductor 238 to gate the audio signal on or off in synchronism with the priority channel.

The output of the inverter 300 is connected through parallel connected capacitor 306 and resistor 308 and thence through a resistor 310 to the base of a transistor 312. The collector of the transistor 312 is connected to the power supply 68 through an indicator lamp 314. A resistor 316 is connected between the collector and ground. The emitter is connected to ground. A capacitor 318 is connected from the resistor 308 to ground. A high signal at the output of the inverter 300 turns on the transistor 312, thus completing the circuit through the lamp 314. This turns on the lamp 314 whenever the priority channel is being received.

The switch 292 completes the circuit of the indicator lamp 278 to the power supply 68 when the priority channel enabling switch 292 is in the on position and the mode switch 274 is in the automatic position as illustrated in FIG. 1. As with the other indicator lamps, the indicator lamp 278 may be beneath the push button operated switch 292, which puch button may be translucent so that its illumination indicates that the priority circuit is on.

A specific embodiment of the invention has been described in some detail. Various modifications may be made by those skilled in the art without departing from the spirit and scope of this invention.

What is claimed is:

1. A scanning radio receiver which automatically scans a plurality of channels of respective predetermined frequencies, said receiver comprising an RF section, variable tuning means for selectively tuning said RF section to said predetermined frequencies, scanning means for causing said variable tuning means to tune said RF section to each of said predetermined frequencies sequentially and periodically, channel selection means coupled to said scanning means for producing enabling pulses in synchronism with the tuning of said RF section to a selected one of said frequencies, signal utilization means for utilizing intelligence received by said RF section, and enabling means responsive to said enabling pulses for coupling said RF section to said signal utilization means substantially only during the portion of each scanning cycle when said RF section is tuned to said selected one of said frequencies.

2. A scanning radio receiver according to claim 1 comprising a signal level sensing means for sensing the signal level of signals received by said RF section and producing a control signal whenever said signal level is above a predetermined magnitude, and indicator means coupled to said scanning means and responsive to said control signal for providing respective indications of when the received signals on the respective channels exceed said predetermined magnitude irrespective of which channel is selected by said channel selection means.

3. A scanning radio receiver according to claim 2 wherein said enabling means includes means responsive to said control signal for coupling said RF section to said signal utilization means substantially only when the received signals exceed said predetermined magnitude on said selected one of said frequencies.

4. A scanning radio receiver according to claim 2 comprising priority channel selector means coupled to said scanning means and responsive to said control signal for providing priority signals whenever the received signals on a selected priority channel exceed said predetermined magnitude, said enabling means including means responsive to said priority signals for coupling said RF section to said signal utilization means substantially only during the portion of each scanning cycle when said RF section is tuned to said selected priority channel irrespective of said enabling pulses.

5. A scanning radio receiver according to claim 1 comprising a signal level sensing means for sensing the signal level of signals received by said RF section and producing a control signal whenever said signal level is above a predetermined magnitude, and priority channel selector means coupled to said scanning means and responsive to said control signal for providing priority signals whenever the received signals on a selected priority channel exceed said predetermined magnitude, said enabling means including means responsive to said priority signals for coupling said RF section to said signal utilization means substantially only during the portion of each scanning cycle when said RF section is tuned to said selected priority channel irrespective of said enabling pulses.

6. A scanning radio receiver according to claim 1 comprising a manual override means acting when manually operated to disable said scanning means and tune said RF section to said selected one of said frequencies at all times.

7. A scanning radio receiver according to claim 1 comprising filter means for excluding the frequencies of said enabling pulses from said signal utilization means.

8. A scanning radio receiver which automatically scans a plurality of channels of respective predetermined frequencies, said receiver comprising an RF section, said RF section including an RF amplifier and a mixer, variable tuning means for selectively tuning said RF section to said predetermined frequencies, said variable tuning means including respective local oscillators producing beating signals at respective beating frequencies for each of said respective predetermined frequencies and gating means associated with each of said oscillators and responsive to gating signals for applying beating signals from the respective oscillators to said mixer, scanning means for causing said variable tuning means to tune said RF section to each of said predetermined frequencies sequentially and periodically, said scanning means including means for developing a plurality of gating signals sequentially and periodically at mutually exclusive times on respective conductors, and means for applying the respective gating signals from said conductors to the respective ones of said gating means, channel selection means coupled to said scanning means for producing enabling pulses in synchronism with the tuning of said RF section to a selected one of said frequencies, said channel selection means including switching means for mutually exclusively coupling to a selected one of said conductors, signal utilization means for utilizing intelligence received by said RF section, said signal utilization means including a transducer producing sound signals, and enabling means responsive to said enabling pulses for coupling said RF section to said signal utilization means substantially only during the portion of each scanning cycle when said RF section is tuned to said selected one of said frequencies.

9. A scanning radio receiver according to claim 8 comprising a signal level sensing means for sensing the signal level of signals received by said RF section and producing a control signal whenever said signal level is above a predetermined magnitude, and indicator means coupled to said scanning means and responsive to said control signal for providing respective visual indications of when the received signals on the respective channels exceed said predetermined magnitude irrespective of which channel is selected by said channel selection means, said indicator means including a visual indicator associated with each of said channels, and an indicator gating means associated with each of said visual indicators and coupled to respective ones of said conductors and responsive to coincidence between respective ones of said gating signals and said control signal for operating respective ones of said visual indicators.

10. A scanning radio receiver according to claim 8 comprising a signal level sensing means for sensing the signal level of signals received by said RF section and producing a control signal whenever said signal level is above a predetermined magnitude, and priority channel selector means coupled to said scanning means and responsive to said control signal for providing priority signals whenever the received signals on a selected priority channel exceed said predetermined magnitude, said priority channel selector means including priority channel gating means, priority channel selector switching means for coupling a selected one of said conductors to said priority channel gating means, and priority channel enabling means for applying when actuated a priority channel enabling signal to said priority channel gating means, said priority channel gating means being responsive to coincidence among all three of said priority channel enabling signal, said gating signals and said control signal to produce said priority signals, said enabling means including means responsive to said priority signals for coupling said RF section to said signal utilization means substantially only during the portion of each scanning cycle when said RF section is tuned to said selected priority channel and said priority channel is being received irrespective of said enabling pulses.

11. A scanning radio receiver according to claim 10 including a priority channel visual indicator responsive to said priority signals for visually indicating when said priority channel is being received.

12. A scanning radio receiver according to claim 8 wherein said signal utilization means includes filter means for excluding the frequency of the enabling pulses from said transducer.

13. A scanning radio receiver according to claim 12 wherein the period of said scanning means is short relative to the periods of audio signals, and said filter means comprises a low-pass filter.

* * * * *